April 13, 1943.  M. J. FINNEGAN  2,316,411
AIRCRAFT ALTITUDE SPACING SYSTEM
Filed Aug. 29, 1941   2 Sheets-Sheet 2

ALTITUDE IN FT.

| | | | | | |
|---|---|---|---|---|---|
| E | 2000 | 4000 | 6000 | 8000 | 10000 |
| N | 1500 | 3500 | 5500 | 7500 | 9500 |
| W | 1000 | 3000 | 5000 | 7000 | 9000 |
| S | 500 | 2500 | 4500 | 6500 | 8500 |

INVENTOR
Martin J. Finnegan
BY
David F. Doody
ATTORNEY

Patented Apr. 13, 1943

2,316,411

UNITED STATES PATENT OFFICE 2,316,411

AIRCRAFT ALTITUDE SPACING SYSTEM

Martin J. Finnegan, Glen Rock, N. J., assignor to Bendix Aviation Corporation, South Bend, Ind., a corporation of Delaware Application August 29, 1941, Serial No. 408,879

5 Claims. (Cl. 177—311)

This invention relates to navigation, and more particularly to a system of traffic control for aircraft.

As scheduled flights along the more prominent civil airways are becoming of greater frequency, it has become necessary for flight in different compass directions to be maintained at prescribed altitudes. It has been found out, however, that due to the fact that the pilot of the plane is often preoccupied with the many problems concerned with the maintenance of flight, he has failed to maintain the prescribed altitude for a given direction of flight.

It is an object of the present invention to provide an instrument whereby an indication of the compliance or non-compliance of an aircraft, with an established traffic system, is readily obtained.

It is another object of the invention to provide an instrument whereby a pilot may be readily advised whether he is in a proper altitude level for the direction of flight being maintained.

Other objects of the invention include the combination of directional and elevational instruments in a manner to keep a pilot advised of his altitude level, and also to indicate, upon either a change of altitude or a change of heading, when his craft is in correct flight condition.

Other objects will appear from a study of the following specification when made in conjunction with the attached drawings, throughout which like numerals designate like parts.

It is a requirement of civil aircraft employing the Federal airways, either in scheduled or in non-scheduled flight, that flights in opposite directions must be spaced by an altitude on the order of 1000 feet. Further, the different airlines now compel their pilots to observe additional requirements of altitude in certain directions of flight, intended to eliminate the possibility of collisions between aircraft flying in any two directions.

Figure 1:
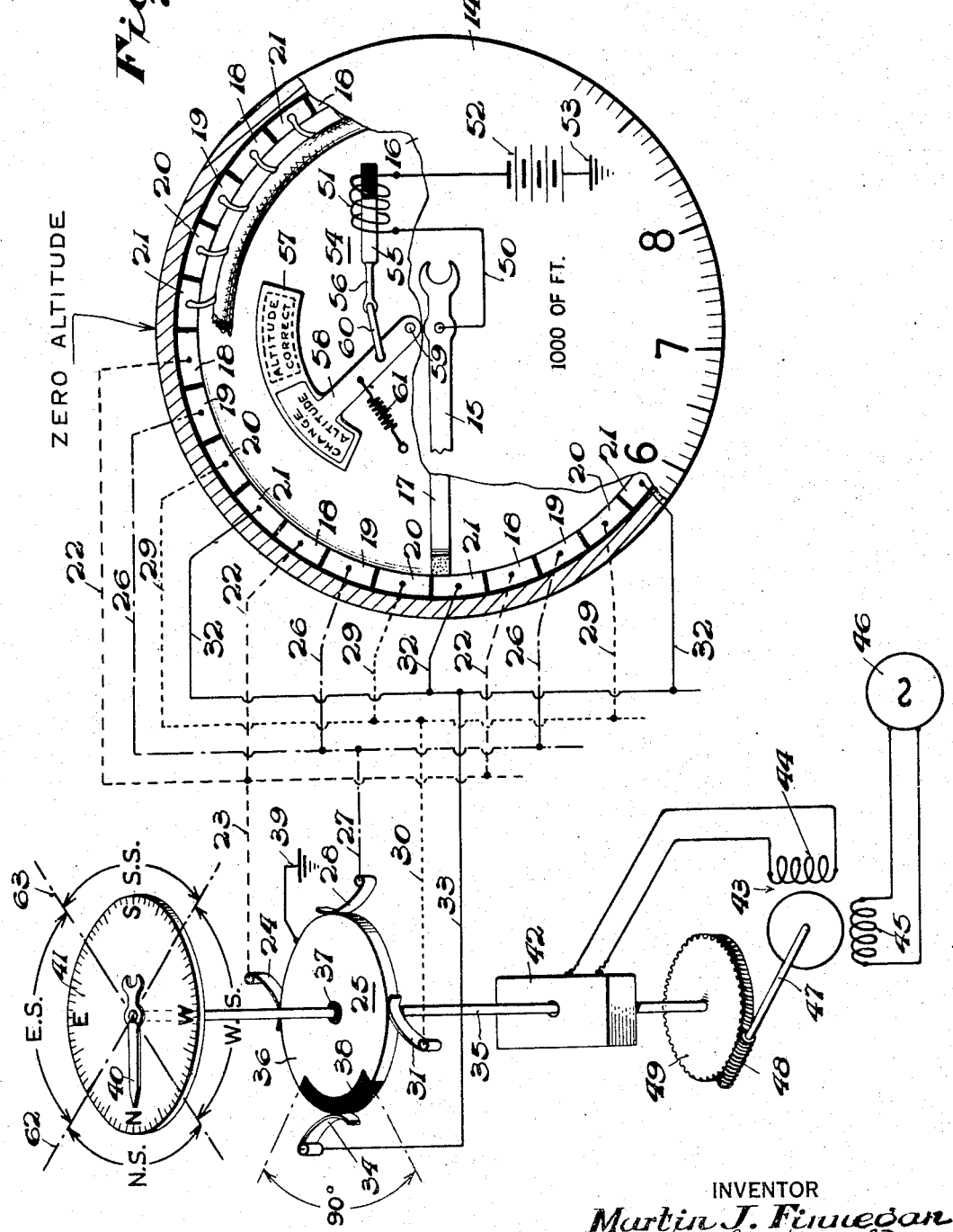
Fig. 1 is a diagrammatic showing, with parts in perspective, of one embodiment of the present invention.
Figures 2, 3:
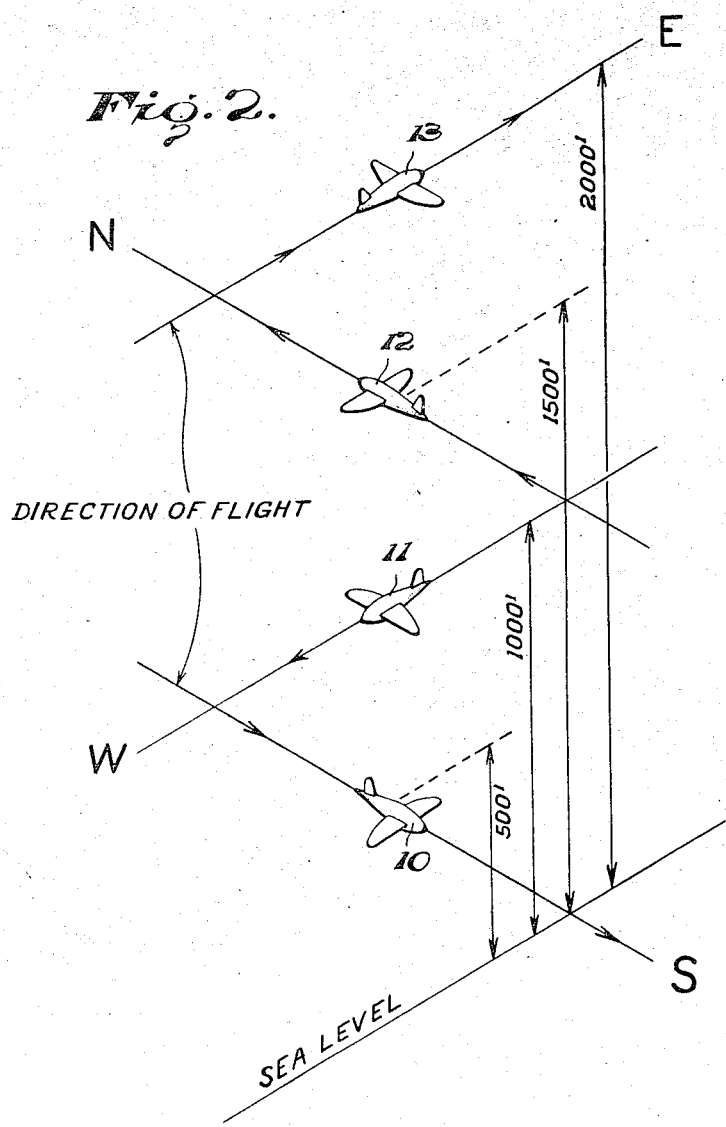
Fig. 2 is a perspective, showing flights in four directions at spaced levels.
Fig. 3 is a representation of a flight altitude schedule representative of a particular traffic control system.

Having reference to Fig. 2, it will be noted that the aircraft designated as 10, 11, 12 and 13 are flying in the respective directions of south, west, north and east, and that the flight of each is separated from the flight of the next adjacent craft by 500 feet. This establishes the basis of an aircraft traffic control system, wherein flights in the cardinal directions are spaced at 500 foot levels. A reference to Fig. 3 shows the arrangement of flights in the four cardinal directions for altitudes between 500 and 10,000 feet, and this system may be taken as an example of a workable traffic control system upon which the device shown in Fig. 1 is based.

An altimeter 14 has a conventional pointer member 15 and altitude indicating scale 16, both of which are shown with parts broken away, revealing a contact arm 17 which is movable with pointer 15, and sets of adjacent insulated contact members 18, 19, 20 and 21 which are disposed throughout the circumference of the casing of the altimeter 14. The contact members 18 are connected by means of conductors 22 to a single conductor 23 attached to brush member 24 of the commutator 25. Contact members 19 are connected together by means of conductors 26 to a common conductor 27, electrically connected to brush member 28, which is 90 degrees away from brush member 24. Contact members 20 are electrically connected in parallel by means of conductors 29, and to a common conductor 30, attached to brush member 31 spaced 90 degrees away from brush 28 and 180 degrees away from brush 24. Contact members 21 are connected together by means of conductors 32, which are commonly connected to a conductor 33, attached to brush member 34, which is spaced 90 degrees away from each of the brushes 24 and 31. Contact members 18, 19, 20 and 21 are of equal size, each extending peripherally for a distance equal to 500 feet of altitude indication. It takes a change in altitude of 500 feet, for example, for contact arm 17 to move completely across a contact 18 to an adjacent contact 19. Additional sets of contacts 18, 19, 20 and 21 are disposed circumferentially within casing of altimeter 14, but in order to avoid showing a confusing multiplicity of conductors in explanation of the invention, complete connections to all these conductors are not shown.

The commutator 25 is fixed to a rotatable shaft 35 and comprises a circular disc of conductive material 36, having a center portion 37 of insulating material, such as Bakelite, and a 90 degree segmental insulating portion 38, of Bakelite or other conventional insulating material. Disc 36 is grounded, as schematically indicated at 39, by any conventional means.

Shaft 35 carries a pointer 40, which is rotatable with respect to a conventional azimuth scale 41 at the upper end of shaft 35.

Scale 41 is intended to be fixed to an aircraft (not shown), while pointer 40 is rotatable with respect to scale 41 to indicate the directional heading of the aircraft at all times. Pointer 40 may be rotated under control of an earth inductor compass of the type shown in Fig. 4 of the La Pierre Patent, 2,053,154. In accordance with the teaching of the La Pierre Patent, a permeable core is rotatable about a central vertical axis by means of a torque amplifying motor, so that at all times the core will be oriented to lie transversely of the north-south axis of the earth's field, and a north bearing pointer is utilized to indicate the direction of the earth's magnetic field, or when mounted in a craft, the heading of the craft. Such a permeable member is contained in a housing 42, as shown in Fig. 1 of the present invention, and is fixed to shaft 35 and a two-phase motor 43, which is the counterpart of the two-phase motor shown in the La Pierre patent. One phase winding 44 is connected (within housing 42), in an appropriate manner, to the permeable member, after the teaching of La Pierre. The second phase winding 45 is connected to a source of alternating current of suitable frequency represented schematically as an alternator 46. The armature of motor 43 is connected to a drive shaft 47, carrying a worm gear 48, which meshes with a wheel 49, keyed to the lower end of shaft 35.

Scale 41 is shown as being divided, by means of the rectangularly associated lines 62 and 63, into four quadrants or sectors, each including a cardinal azimuth direction. Preferably, each of these sectors, which are labeled "N. S." (north sector), "E. S." (east sector), "S. S." (south sector) and "W. S." (west sector), extends 45 degrees on each side of a cardinal heading, for example, the north sector extends from northeast to northwest, and the center line of such sector passes through north. Brush members 34, 24, 28 and 31 lie directly under the scale indications of North, East, South and West, respectively.

It will be seen that at any one time, one of the brush members will be in contact with the insulating sector 38 of armature 25, while the other three will be in contact with the conductive portion 36. Thus, one of the conductors 23, 27, 30 and 33, is always open-circuited in an electrical circuit, which may be traced from a ground 39, commutator 25, parallel conductors 23, 27, 30 and 33, to contact segments 18, 19, 20 and 21 through contact arm 17, conductor 50, solenoid 51, battery 52 and ground 53. Solenoid 51 is a part of a relay 54, having an iron core member 55 with an integral arm 56. Conductor 50 is connected to contact arm 17 through any suitable pivot bearing connection.

Scale 16 is provided with a window portion, the outline of which is designated by the closed dashed line 57. A flag member 58 is pivoted at a point 59, and is also connected by means of a loose link 60, to relay arm 56. Flag 58 carries two indications, for example, "Change altitude" and "Altitude correct." When relay 51 is open-circuited or de-energized, flag member 58 is maintained in the position shown by the action of a coiled spring member 61. In this position, the legend "Altitude correct" appears in window 57, and the legend "Change altitude" is obscured by the opaque face of scale 16.

From Fig. 1 it will be seen that the craft is heading north, and contact arm 17 is in engagement with a contact 21 at about 3500 feet. Since conductor 32 connects to conductor 33, it will be seen that brush 34 bears against the insulating sector 38, and thus, the electrical circuit is maintained open, and relay 54 is de-energized. An inspection of Fig. 3 will show that an altitude of 3500 feet is correct for a course heading of north. Thus, the showing of the indication "Altitude correct" is in accordance with the system. If, however, the airplane should change its heading to west, remaining at 3500 feet, it will be seen that brush 34 then comes in contact with the conductive portion 36, and the electrical circuit containing relay 54 becomes completed, and flag member 58 is moved to the right by the attraction of 55 within solenoid 51, and the warning "Change altitude" appears within window 57. The pilot, upon seeing the warning, merely increases or decreases his altitude until the indication "Altitude correct" appears at window 57. Assuming that he decreases altitude, this will occur when pointer 17 moves upwardly into engagement with the adjacent contact segment 20, and the altitude indication will be 3000 feet.

It will be understood, of course, that when the craft is heading west, insulating sector 38 is in contact with brush 31 so that upon arm 17 coming in contact with contact segment 20, the electrical circuit will become opened, and relay 54 will be de-energized. Had the pilot desired to increase his altitude rather than to decrease it for a westerly heading, he could have gone to 5000 feet, at which time contact arm 17 would again be in circuit with a contact 20, and relay 54 would again become de-energized, allowing flag 58 to show that an altitude of 5000 feet for a westerly heading is correct.

From the above example of navigation in accordance with the particular aircraft traffic control system set forth, it will be readily seen that in sectors each including a cardinal compass direction, the altitudes of aircraft are spaced by intervals of 500 feet. The chart shown in Fig. 3 lists the particular aircraft altitudes appropriate for flights in the different cardinal directions up to 10,000 feet, and it is obvious that this aircraft traffic control schedule may be expanded to any altitude level selected.

While the indicating element used in the description of the particular embodiment of the invention set forth in Fig. 1 is shown as indicating flag 58, it is obvious that other indicators, such as buzzers or two-colored lights, may be utilized either with or without a relay system. It is desired, therefore, not to limit the invention to the particular indicator selected for the purpose of description, since many modifications may occur to one skilled in the art in following the teaching of the present invention. The invention is to be limited, therefore, only by the scope of the appended claims.

What is claimed is:

1. A device for indicating a desired flight level of an aircraft, comprising an altimeter, a compass including a directive element having an axis of rotation, a motor, a shaft connected thereto and passing through said axis, a commutator carried by said shaft, a plurality of sets of contacts carried by said altimeter and regularly distributed about the periphery thereof, four brushes in contact with said commutator, said brushes being spaced about said commutator at intervals of ninety degrees and each lying in a different compass sector, connections between four adjacent of said contacts and each of said brushes, other adjacent contacts being connected in parallel and in the same sequence to each of said brushes, means for closing an electrical connection through different ones of said contacts at different indicated altitudes, a solenoid in circuit with said contacts, brushes and commutator, a source of electrical energy for said solenoid, a flag carrying matter indicating a flight altitude condition, and means connecting said flag and said solenoid, whereby upon a change of heading of the craft from one compass sector to another, operation of said solenoid will actuate said flag to indicate that a change in altitude level should be made.

2. In a navigational system wherein flights in the cardinal directions are to be at spaced altitudes, a device for indicating an aircraft's compliance or non-compliance therewith, comprising an altimeter having a scale and pointer, a contact arm movable with said pointer, a plurality of sets of contacts radially disposed about said contact arm and engageable therewith, each contact in said set being spaced from other contacts in the same set by a fixed amount, electrical control means in circuit with said contact arm, a source of electrical energy for energizing said control means, an indicating member in circuit with said contact arm, a compass having a directive element aligned in the earth's field, a commutator carried by said element, brushes associated with said commutator and lying in compass sectors 90 degrees apart and connections between each set of said contacts and said brushes, whereby said indicating member will, under supervision of said control means, show the compliance or non-compliance of the craft with the system.

3. In a traffic spacing system for aircraft, a device for indicating an aircraft's compliance or non-compliance therewith, including a compass having a directive element subject to the influence of the earth's magnetic field, an altimeter having a set of contacts regularly spaced through the indicating range of said altimeter, an electrical circuit, an indicator in said circuit, means in circuit therewith for operating said indicator, and electrical connections associated with said circuit and with said compass, so that, upon a cardinal change of azimuth indication by said compass, said indicator will be actuated to show the compliance or non-compliance of a craft with the system.

4. In an air traffic system whereby flights in four sectors of azimuth are to be at spaced altitude levels, a device for indicating the compliance or non-compliance of a craft therewith, including a compass having an element rotatable with respect to the craft in azimuth, a commutator mechanism responsive to rotation of said element, an altimeter having an altitude scale and carrying four sets of contacts, insulated and regularly spaced with respect to the altitude indications of said scale, a relay, a source of electrical energy therefor, a rotatable contact in circuit with said relay and associated with said altimeter and movable over different ones of said contacts for different flight altitudes and connections between each of said sets of contacts and said commutator mechanism, whereby, upon a change of compass heading from one of said four sectors to another, said relay will be actuated to show the compliance or non-compliance of said craft with said traffic system.

5. In an air traffic spacing system, an aircraft instrument for indicating the compliance or non-compliance of the craft therewith, said instrument including a member having a pointer and a plurality of sets of contacts arranged about said pointer, a brush member carried with said pointer, said pointer being rotatable to different radial positions for different craft altitudes, a magnetic compass, a directive element as part thereof rotatable with respect to said craft for different headings in azimuth, a shaft for rotating said element, a commutator carried by said shaft, brushes associated therewith, connections between each of said sets of contacts and different ones of said brushes, a solenoid in circuit with said first mentioned brush member, a source of electrical energy therefor, and indicating means operated by said solenoid to show the compliance or non-compliance of the craft with said system.

MARTIN J. FINNEGAN.